US012442332B2

(12) United States Patent
Kioua

(10) Patent No.: US 12,442,332 B2
(45) Date of Patent: Oct. 14, 2025

(54) PROPULSION UNIT FOR AN AIRCRAFT COMPRISING A SYSTEM FOR SEALING BETWEEN TWO AIR INTAKE PARTS

(71) Applicant: SAFRAN NACELLES, Gonfreville-l'Orcher (FR)

(72) Inventor: Hazem Kioua, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 229 days.

(21) Appl. No.: 18/257,367

(22) PCT Filed: Dec. 13, 2021

(86) PCT No.: PCT/FR2021/052292
§ 371 (c)(1),
(2) Date: Jun. 14, 2023

(87) PCT Pub. No.: WO2022/129756
PCT Pub. Date: Jun. 23, 2022

(65) Prior Publication Data
US 2024/0026819 A1    Jan. 25, 2024

(30) Foreign Application Priority Data
Dec. 14, 2020   (FR) ...................... 2013170

(51) Int. Cl.
*F02C 7/042* (2006.01)
*F02C 7/28* (2006.01)
(52) U.S. Cl.
CPC ............... *F02C 7/042* (2013.01); *F02C 7/28* (2013.01); *F05D 2220/323* (2013.01)

(58) Field of Classification Search
None
See application file for complete search history.

(56) References Cited

U.S. PATENT DOCUMENTS

| | | | |
|---|---|---|---|
| 2014/0048656 A1* | 2/2014 | Schlipf | ............... B64C 9/22 244/214 |
| 2018/0283203 A1* | 10/2018 | Manepalli | ............... F01D 25/24 |
| 2018/0283276 A1 | 10/2018 | Todorovic | |
| 2021/0070460 A1* | 3/2021 | Ramlaoui | ............. B64D 29/00 |

OTHER PUBLICATIONS

International Search Report mailed Mar. 28, 2022, issued in corresponding International Application No. PCT/FR2021/052292, filed Dec. 13, 2021, 5 pages.
Written Opinion mailed Mar. 28, 2022, issued in corresponding International Application No. PCT/FR2021/052292, filed Dec. 13, 2021, 5 pages.

* cited by examiner

*Primary Examiner* — Gerald L Sung
*Assistant Examiner* — Jacek Lisowski
(74) *Attorney, Agent, or Firm* — CHRISTENSEN O'CONNOR JOHNSON KINDNESS PLLC

(57) ABSTRACT

A propulsion unit for an aircraft includes a gas generator and an air intake with an upstream annular lip that is axially translatable. The propulsion unit further includes a sealing system of an annular shape that is borne by the lip at its downstream edge. The sealing system has an annular envelope with a downstream annular surface configured to bear on an upstream edge of the rest of the air intake. The sealing system also includes at least one elastically deformable member situated at the downstream edge of the lip and configured to be elastically deformed by compression and to exert an elastic return force on the envelope.

17 Claims, 7 Drawing Sheets

A-A

B-B

PROPULSION UNIT FOR AN AIRCRAFT COMPRISING A SYSTEM FOR SEALING BETWEEN TWO AIR INTAKE PARTS

FIELD OF THE DISCLOSURE

The present disclosure relates to a propulsion unit for an aircraft.

BACKGROUND

A propulsion unit for an aircraft typically comprises a gas generator and an air intake.

A gas generator comprises, from upstream to downstream, with reference to the flowing of the gases, at least one compressor, an annular combustion chamber and at least one turbine. The gas generator is, for example, a turbomachine or a turbojet engine.

The air intake or inlet is located upstream of the gas generator and ensures the channel of the air flow into the gas generator. In the case of a turbomachine or a turbojet engine with a fan, the air intake is formed by a nacelle surrounding the fan located upstream of the gas generator.

A propulsion unit can be installed in a lateral or central position on an aircraft. In the lateral position, the propulsion unit is located under a wing or at the rear of the fuselage of the aircraft. In the central position, the propulsion unit is located at the rear of the fuselage of the aircraft.

The air flow rate required by the propulsion unit depends mainly on the engine speed and the speed of the aircraft. In addition, the air must arrive at the engine at a subsonic speed and in a laminar flow.

For aircraft operating in the subsonic and supersonic ranges, one of the techniques used to control the air flow rate towards the engine in all flight ranges is to use a variable geometry air intake, varying according to the use of the aircraft and its speed range. For example, some fighter aircraft are designed with aerodynamic characteristics in front of the air intake to reduce the air speed at the inlet (ramp, splitter, inclined rectangular cross-section, etc.).

However, most supersonic aircrafts use variable geometry air intakes. The cross-section is varied either by means of movable ramps (pivot doors) which allow more or less air to pass through or via a translating central nucleus (in the case of circular cross-sections) referred to as "spike". However, these solutions are complex and involve a lot of mass.

Alternatively, the air intake cross-section can be varied by translating the upstream part of the air intake, also referred to as the movable air intake. The movable air intake is thus configured to move between a forward position in which the movable air intake is spaced from the rest of the stationary air intake and in which an air intake passage in the propulsion unit is created between the movable air intake and the stationary air intake, and a rearward position in which the movable air intake is glued or nested to the rest of the stationary air intake.

In this solution, the shape of the downstream edge of the movable air intake can be an "inverted S" or a "C" shape in an axial sectional plane.

The "inverted S" shape is favourable in the forward position because it provides an aerodynamic shape that allows a good laminar flow of the air entering into the propulsion unit through the open passage of the movable air intake, but is unfavourable in the rearward position. This is because the "inverted S" shape does not allow for a smooth external line of the air intake in the rearward position. This deformation of the external line then causes losses in the flowing of the air.

In addition, the "C" shape is favourable in the rearward position because the external line of the air intake can be smooth, but unfavourable in the forward position. This is because the "C" shape does not have an optimised aerodynamic shape downstream of the movable air intake and does not allow a good laminar flowing of the air entering into the propulsion unit through the passage opened by the movable air intake.

A seal referred to as "inflatable" can be used at the level of the downstream edge of the stationary air intake. The seal must then have an aerodynamic shape in the forward position and a retracted shape in the rearward position. It is known for this is a seal having at least one hollow chamber whose volume can be controlled by means of a management system configured to inject air or gas inside the chamber, as described in the document US-A1-2018/283276. The amount of air injected into the seal by the management system allows to change from the retracted shape to the extended shape depending on whether the movable air intake is in the forward or rearward position, i.e. depending on engine speed. However, the management system allowing to adjust the amount of air injected into the chamber of the seal is complex and expensive to carry out.

The present disclosure proposes a solution to at least some of the above problems.

SUMMARY

The disclosure relates to a propulsion unit for an aircraft, this propulsion unit comprising:
- a gas generator having a longitudinal axis and comprising at least one compressor, a combustion chamber and at least one turbine arranged one behind the other along the axis, and
- an air intake of generally tubular shape disposed upstream of the gas generator with reference to the flowing of the gases in operation, this air intake comprising an upstream annular lip which is movable in axial translation along the axis from a rearward position in which it comprises a downstream edge adjoining an upstream edge of the rest of the air intake, and a forward position in which its downstream edge is spaced from the upstream edge of the rest of the air intake, and
- a generally annular sealing system which is carried by the lip at the level of its downstream edge and which is configured to adopt, in the rearward position, a restricted state in which it ensures a sealing between the downstream edge of the lip and the upstream edge of the rest of the air intake, and an extended state in which it defines at the level of the downstream edge an aerodynamic airflow profile inside the gas generator,
characterised in that the sealing system comprises:
- an annular envelope made of a first material and extending around the axis and at the level of the downstream edge of the lip, this envelope comprising a downstream annular surface configured to bear on the upstream edge of the rest of the air intake and to define the aerodynamic profile, and
- at least one member made of a second material different from the first material and elastically deformable, this member being located at the level of the downstream edge of the lip and configured to be elastically deformed by compression when the lip is in its rearward position and to exert an elastically return force on the envelope when the lip passes from its rearward position to its forward position, so that the sealing system adopts the aforementioned extended state autonomously.

The disclosure thus proposes a sealing system configured to pass from its retracted position to its extended position autonomously, in particular by natural elastic return.

In the rearward position, the downstream edge of the movable annular lip nest onto the upstream edge of the rest of the air intake, the sealing system is compressed, thus allowing to maintain a favourable aerodynamic shape, while minimising losses.

In the forward position, the sealing system is released and passes into its extended state autonomously, in particular due to the elastic return force exerted by the member on the envelope, thus giving a favourable aerodynamic shape to the downstream annular surface of the envelope and allowing a good flowing of air entering the propulsion unit through the passage released by the movable air intake.

The elastic return of the envelope is autonomous, thus the disclosure allow to avoid the need for a complex and costly system for managing the shape of the sealing system.

The propulsion unit according to the disclosure may comprise one or more of the following characteristics, taken alone or in combination with each other:
- the first material is an elastically deformable material or a technical fabric; in the present application, a technical fabric means a fabric having predetermined technical (and in particular mechanical) properties,
- the envelope is generally L- or C-shaped in axial cross-section and comprises at least one cylindrical rim for attaching or connecting to the downstream edge of the lip,
- the member is selected from:
  - an annular lip of elastically deformable material,
  - an annular seal of elastically deformable material, this seal comprising an internal annular cavity, and
  - a spring, for example metallic,
- it comprises a plurality of springs distributed around the axis on the downstream edge of the lip,
- the member is housed in an annular space defined between the envelope and the downstream edge of the lip,
- the member is intimately connected to the envelope and extends at least partly into an extension thereof,
- at least one of the elements selected from the envelope and the member is attached by at least one clip, one clamp, or seam to the downstream edge of the lip,
- the envelope is connected by a plurality of wires to the downstream edge of the lip, these wires being intended to be tensioned when the envelope is in its extended position,
- the space is connected to the atmosphere by at least one pressurisation pipe,
- the member has a general shape in axial cross-section of L, C, W, V, S, K or O, and
- the air intake is arranged coaxially upstream of the gas generator.

DESCRIPTION OF THE DRAWINGS

Further characteristics and advantages of the disclosure will become apparent from the following detailed description, for the understanding of which reference is made to the attached drawings in which:

FIG. 5a is a schematic representation in radial cross-section of a part of the movable annular lip of the air intake with the use of springs and FIGS. 5b, 5c, 5d, 5e are schematic representations of different variants of the sealing system according to the disclosure comprising springs in axial cross-section according to the sectional axis A-A (5b, 5d) and according to the sectional axis B-B (5c, 5e) of FIG. 5a;

FIGS. 5f, 5g are schematic representations of other variants of the sealing system according to the disclosure comprising springs in axial cross-section along the sectional axis A-A (5f) and along the sectional axis B-B (5g) of FIG. 5a;

DETAILED DESCRIPTION

Figure 1:
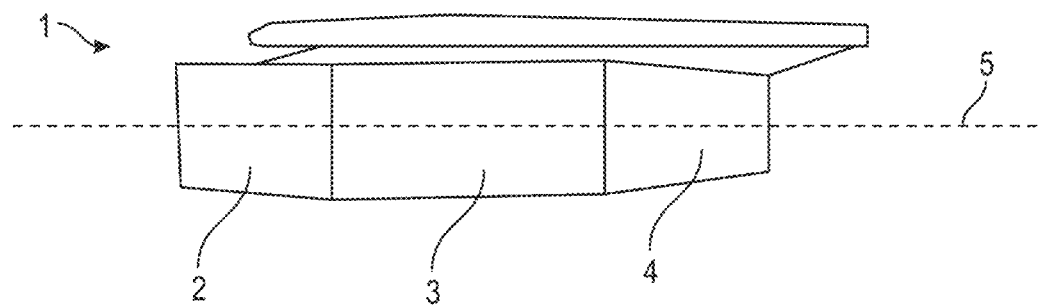
FIG. 1 is a very schematic view of a propulsion unit of an aircraft.

As shown in FIG. 1, a propulsion unit 1 for an aircraft comprises a gas generator 3 with a longitudinal axis 5. The propulsion unit is attached here in a lateral position to a wing of the aircraft but could be attached in a different position.

The gas generator 3 comprises at least one compressor, one combustion chamber and at least one turbine (not shown) arranged one behind the other along the axis 5. Also, an inverter 4 or a rear cover is arranged coaxially downstream of the gas generator 3.

The propulsion unit 1 also comprises a generally tubular air intake 2 arranged, for example coaxially, upstream of the gas generator 3.

Unless otherwise specified, the adjectives inner/internal and outer/external are used with reference to a radial direction so that the inner (i.e. radially inner) part of an element is closer to the axis 5 than the outer (i.e. radially outer) part of the same element.

Figure 2A:
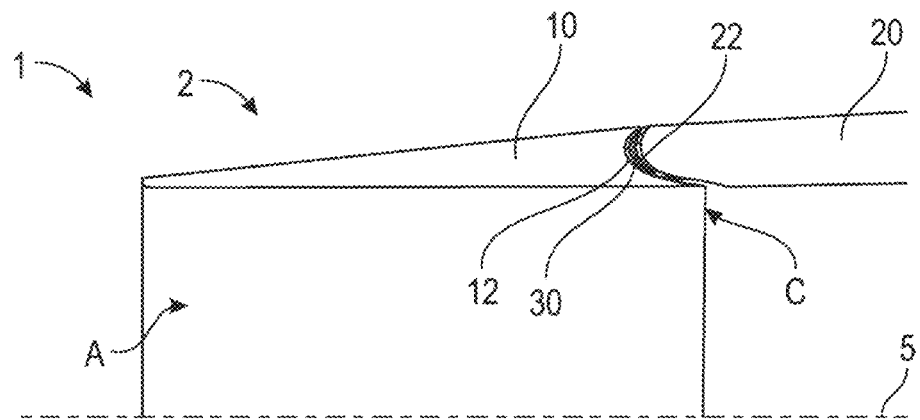
FIGS. 2a and 2b are schematic partial axial cross-sections of an air intake in a rearward position (FIG. 2a) and in a forward position (2b)
Figure 2B:
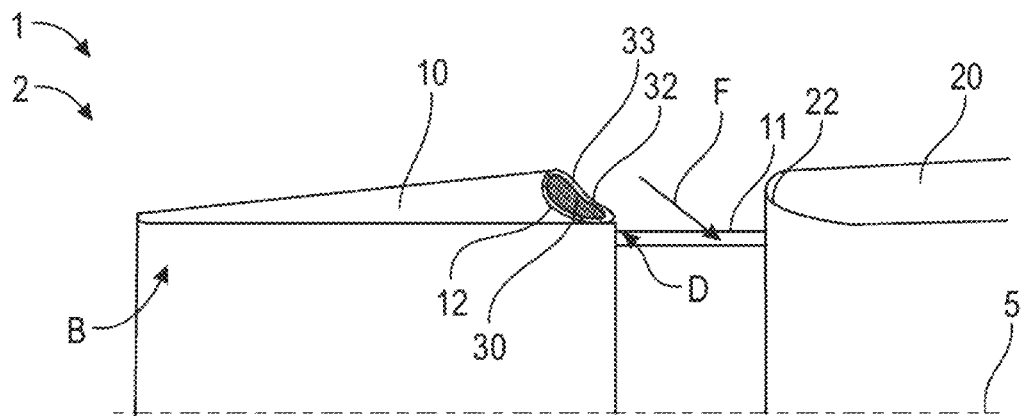
Figure 3:
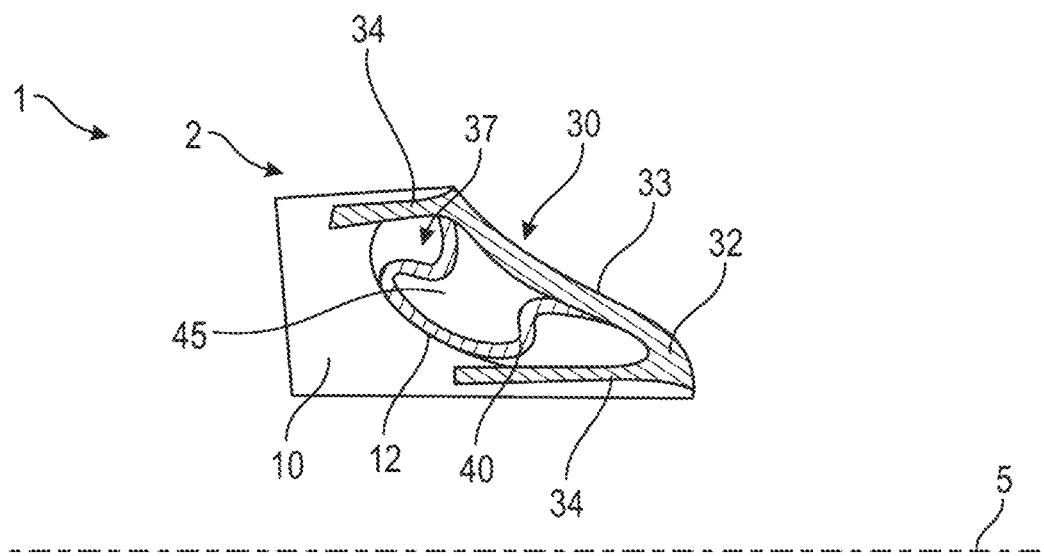
FIG. 3 is a schematic representation in axial cross-section of a sealing system on a downstream edge of a movable annular lip of the air intake.

As illustrated in FIGS. 2a, 2b, this air intake 2 comprises an upstream annular lip 10 and a downstream stationary part 20, referred to here as the rest of the air intake, downstream of the annular lip 10. The annular lip 10 comprises a downstream edge 12, in particular with a height of approximately 80 mm to 100 mm. The rest of the air intake 20 comprises an upstream edge 22. The annular lip 10 is axially movable along the axis 5. The translation is carried out by translating bars 11 set in motion for example by an actuator system (not shown). The air intake 2 thus translates between a rearward position A and a forward position B. In the rearward position A, the downstream edge 12 of the annular lip 10 is adjoint to the upstream edge 22 of the rest of the air intake 20. In the forward position B, the downstream edge 12 of the annular lip 10 is spaced from the upstream edge 22 of the rest of the air intake 20 so that an air intake passage F into the propulsion unit is opened up.

The propulsion unit 1 further comprises a generally annular sealing system 30 which is carried by the annular lip 10 at the level of its downstream edge 12. The sealing system 30 is shown very schematically in FIGS. 2a and 2b and is illustrated in more detail in the following figures.

The sealing system 30 is configured to adopt, in the rearward position A, a restricted state C in which it ensures a sealing between the downstream edge 12 of the lip 10 and the upstream edge 22 of the rest of the air intake 20. In its restricted state C, the sealing system 30 according to the disclosure allows the outer line of the air intake to remain smooth so that the air flow outside the air intake is not disturbed.

The sealing system 30 is further configured to adopt, in the forward position B, an extended state D in which it defines at the level of the downstream edge 12 an aerodynamic profile of airflow entering inside the gas generator 3. In its extended state C, the sealing system 30 according to the disclosure thus creates an aerodynamic profile allowing a good laminar flowing of the air entering the propulsion unit.

The sealing system 30 may be multi-layered and of various materials, in particular of reinforced polymer (silicone or other) (metal support or technical fibre fabric) and containing an anti-wear layer.

The sealing system 30 may have a variable axial cross-section in case of a variable contour of the air intake. The sealing system 30 can be continuous so that it forms an annulus or cut into several sectors jointed together, for example by end caps. The sealing system 30 may have air evacuation holes (vents).

The sealing system 30 comprises an annular envelope 32 which extends around the axis 5 and at the level of the downstream edge 12 of the lip 10. This envelope 32 comprises a downstream annular surface 33 configured to come bear on the upstream edge 22 of the rest of the air intake 20 in the rearward position A. The envelope 32, and in particular its downstream annular surface 33, also defines the aerodynamic profile of the air flow entering inside the gas generator 3 in the forward position B of the annular lip 10.

In the examples shown in FIGS. 3 to 7, the envelope 32 is made of an elastically deformable material. In the examples shown in FIGS. 8 to 9, the envelope 32 is made of a technical fabric 32'.

According to one embodiment, it can be seen that the envelope 32 has a general C shape in axial cross-section and comprises two cylindrical rims 34 for attaching or connecting to the downstream edge 12 of the lip 10. The cylindrical rims 34 form the ends of the C-shape.

According to an alternative embodiment (FIGS. 4i and 8d), the envelope 32 is L-shaped in axial cross-section, for example, and comprises a cylindrical rim 34 for attaching or connecting to the downstream edge 12 of the lip 10.

The sealing system 30 further comprises at least one elastically deformable member 40 located at the level of the downstream edge 12 of the lip 10. More specifically, the member 40 is for example housed in an annular space 37 defined between the envelope 32 and the downstream edge 12 of the lip 10. The member 40 is configured to be elastically deformed by compression when the lip 10 is in its rearward position A. When the annular lip 10 moves from its rearward position A to its forward position B, the member 40 is configured to exert an elastic return force on the envelope 32, so that the sealing system 30 adopts the aforementioned extended state D autonomously.

Preferably, the member 40 and the envelope 32 are separate. In particular, the member 40 and the envelope 32 are made of different materials.

Figure 4A:
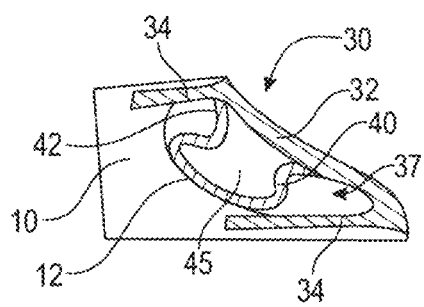
FIGS. 4a, 4b, 4c are schematic representations in axial cross-section of different alternative embodiments of the sealing system according to the disclosure.
Figure 4B:
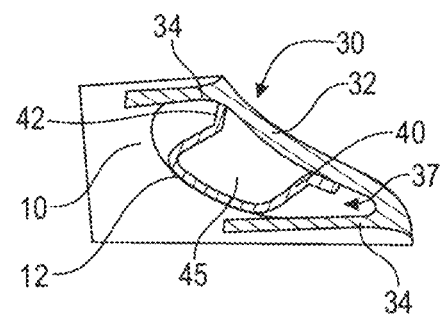
Figure 4C:
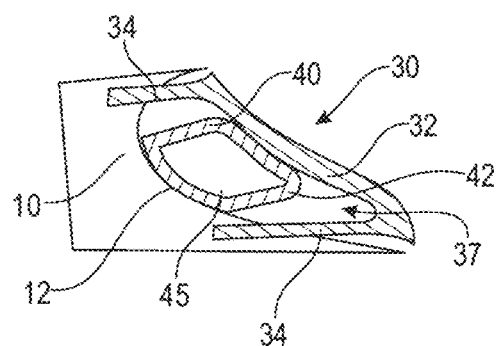
Figure 4D:
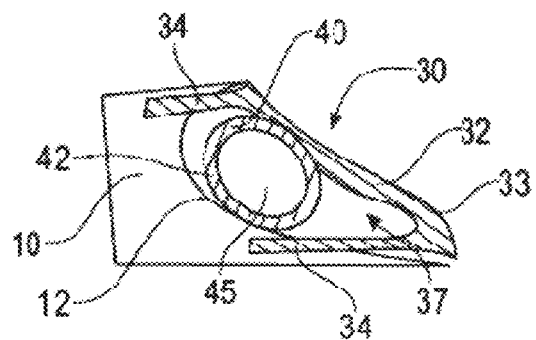
FIGS. 4d, 4e, 4f, 4g, 4h, 4i are schematic representations in axial cross-section of different alternative embodiments of the sealing system according to the disclosure.
Figure 4E:
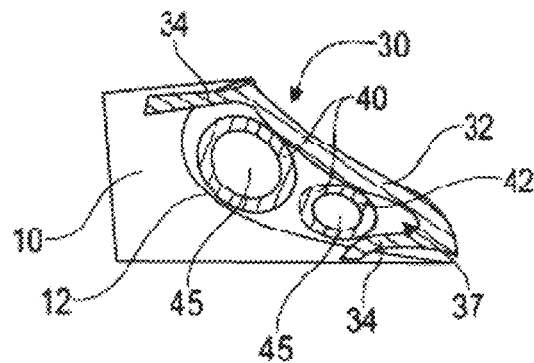

The member 40 is, for example, an annular seal 42 made of elastically deformable material, this seal 42 comprising an internal annular cavity 45 (FIGS. 4a to 4d in particular). In particular, the member 40 has an omega-shaped axial cross-section with a heel (FIGS. 4a and 4b), a trapezoidal or diamond shape (FIG. 4c), a circular shape (FIG. 4d) or a double circular shape (FIG. 4e).

Figure 4F:
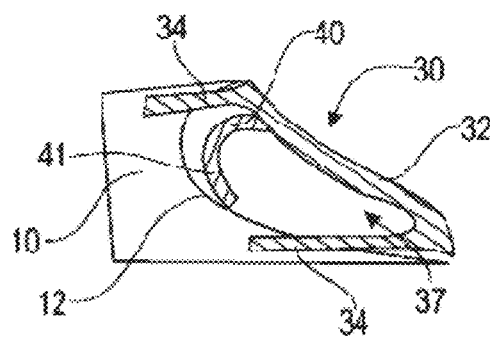
Figure 4G:
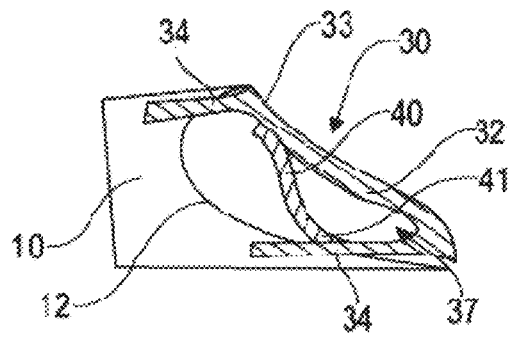
Figure 4H:
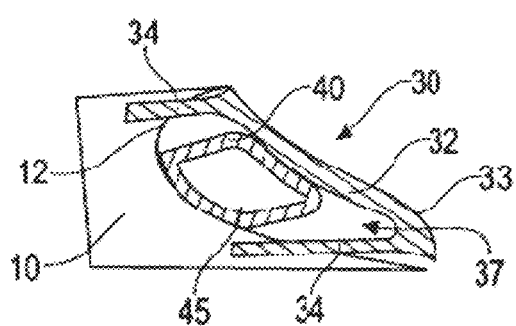

Alternatively, the member 40 may be an annular leg 41 made of elastically deformable material (FIGS. 4f and 4g in particular). The leg 41 may for example be C-shaped (FIG. 4f) or K-shaped with heels (FIG. 4g).

Figure 4I:
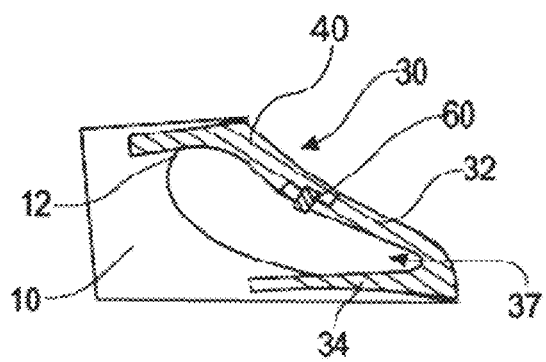

The member 40 is, for example, intimately connected to the envelope 32 and may extend at least partly in an extension thereof (FIG. 4i). In this case, the sealing system 30 comprises, for example, a means 60 for attaching the member 40 to the envelope 32. As shown in this figure, the member 40 may be located outside the envelope 32. Alternatively, the positioning of the member 40 and of the envelope could be reversed so that the envelope 32 would be outside the member 40.

The member 40 also has, for example, in axial cross-section a general shape in the form of L, C, Ω, V, S, K or O allowing it in particular to retract in the rearward position A and to exert an elastic return force on the envelope 32 in the forward position B of the annular lip 10.

Figure 5A:
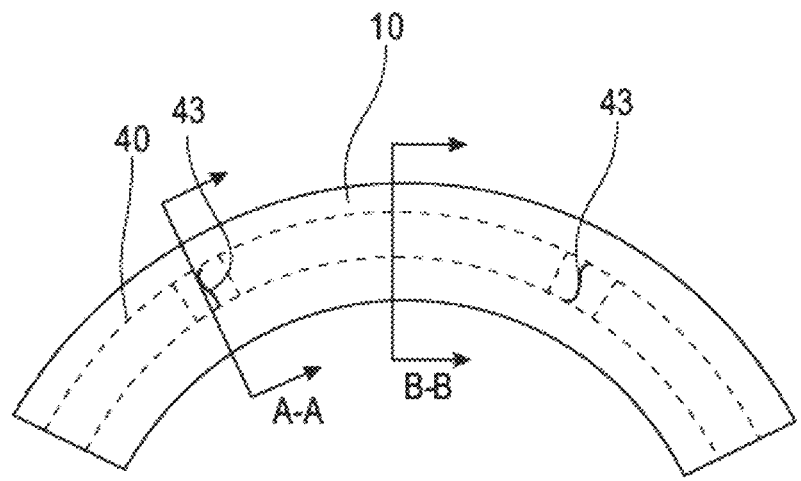
Figure 5B:
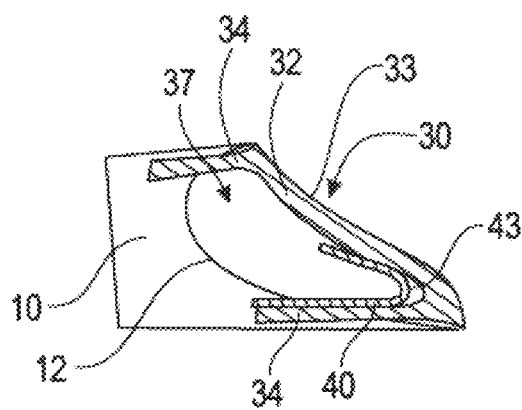

As shown in FIGS. 5a to 5g, the member 40 may comprise at least one return spring 43, for example metallic. In particular, the spring 43 allows to increase the return force allowing the sealing system 30 to move from the retracted position to the extended position. The sealing system 30 here comprises a number of springs 43 distributed at different intervals of the circumference around the axis 5 on the downstream edge 12 of the lip 10, as shown in FIG. 5a.

Figure 5C:
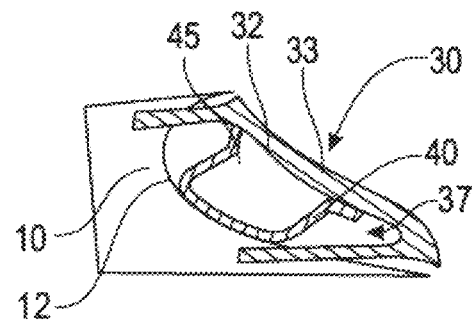
Figure 5D:
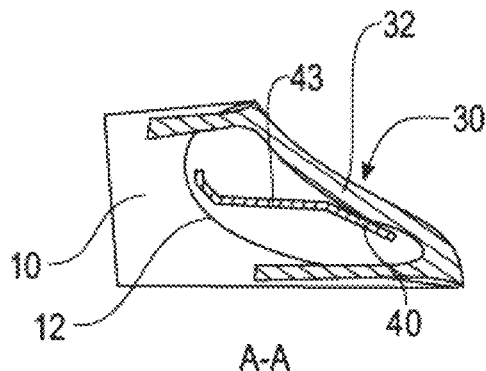
Figure 5E:
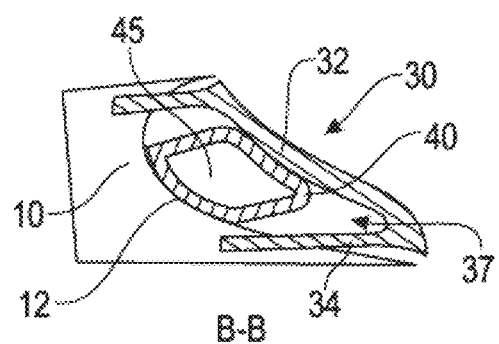
Figure 5F:
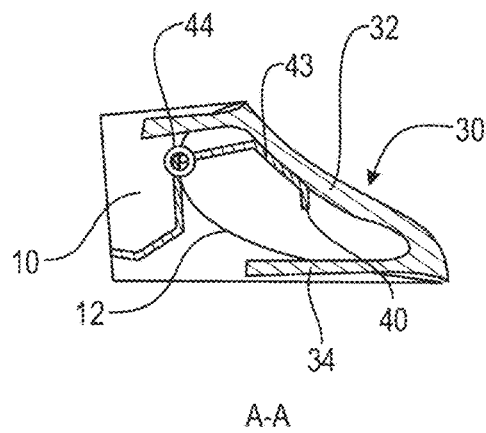
Figure 5G:
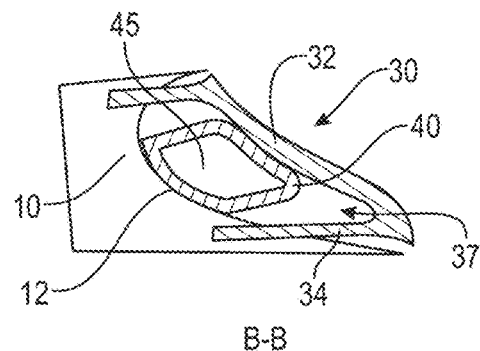

The springs 43 can be combined with annular seals 42 and/or annular legs 41, as shown in FIGS. 5c, 5e, 5g (cross-section according to the sectional plane B-B in FIG. 5a).

The springs 43 are thus placed along the circumference of the downstream edge 12, either alternating with annular legs 41 and/or annular seals 42 (as shown), or in parallel with annular legs 41 and/or annular seals 42.

For example, the spring 43 may be a U-shaped (FIG. 5b) or S-shaped (FIG. 5d) flexible blade. It can also be a torsion spring 43 with lever (FIG. 5f). In the latter case, the member 40 comprises a pivot 44 around which the lever-operated tension spring 43 pivots.

Figure 6A:
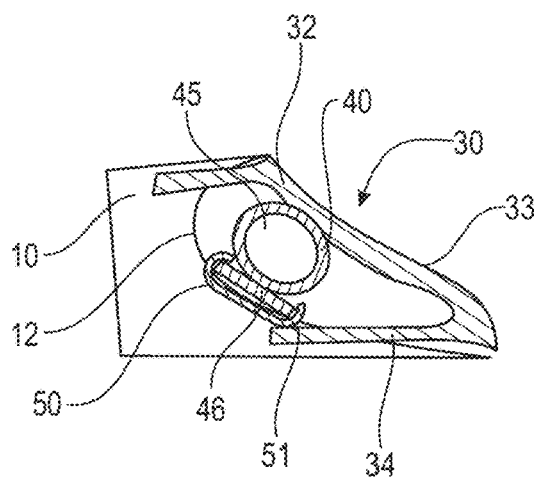
FIGS. 6a, 6b are schematic representations in axial cross-section of different variants of the sealing system according to the disclosure comprising an attachment means.
Figure 6B:
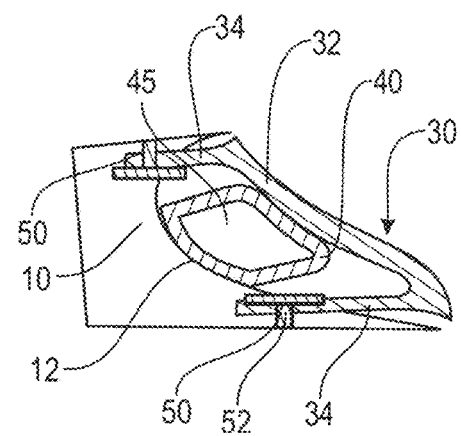

As shown in FIGS. 6a, 6b, at least one of the elements selected from the envelope 32 and the member 40 is attached by at least one attachment means 50 to the movable air intake.

The attachment means 50 may comprise a clip 51, also known as a "C" seal-support (FIG. 6a). In particular, the clip 51 allows to attach a base 46 of the member 40 to the annular lip 10.

The attachment means 50 may also comprise a clamp 52, also known as a sandwich seal attachment (FIG. 6b). In the latter case, the clamp 52 allows to attach the cylindrical rims 34 of the envelope 32 to the annular lip 10.

Figure 7A:
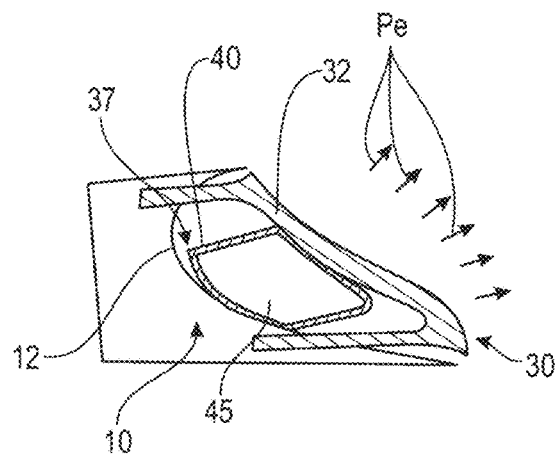
FIGS. 7a and 7b are schematic representations in axial cross-section of different variants of the sealing system according to the disclosure.

As illustrated in FIG. 7a, a negative external pressure Pe (e.g. generated by air suction from the propulsion unit) will help the envelope 32 to regain its aerodynamic shape naturally when moving from the rearward position A to the forward position B.

Figure 7B:
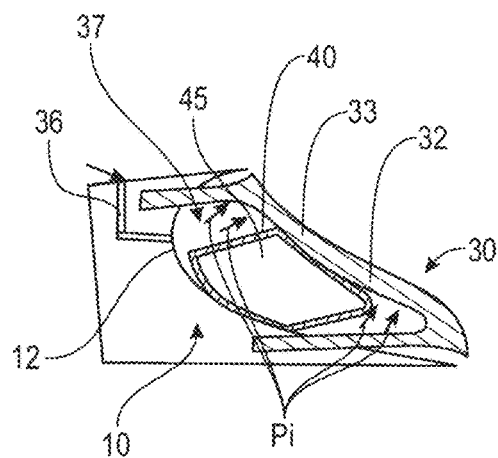

If the external pressure Pe is not always negative or is not sufficient in all cases of flight, an internal pressurisation Pi can be used. In this case, and as illustrated in FIG. 7b, an inflatable sealing system 30 may be used. The air can be collected from the external air, from the internal air at the air intake 2 if the pressure P is positive and sufficient, or from the internal air of the propulsion unit. Indeed, the space 37 may possibly be connected to the atmosphere outside or inside the air intake by at least one pressurisation pipe 36. This increases the internal pressure Pi and allows the envelope 32 to regain its aerodynamic shape. If the external or internal pressure at the air intake is not sufficient, the air can also be collected from another location of the propulsion unit and conducted through a supply tube into the space 37.

The air flow rate can be controlled and the pipe 36 can be closed off when the translation bars (referenced 11 in FIG. 2b) are retracted.

As shown in FIGS. 8a, 8b, 8c, 8d, the envelope 32 may be made of a technical fabric 32'. This technical fabric 32', in particular a resistant fabric, can be made of different materials or composite materials, in particular Kevlar, glass. This technical fabric 32' allows to ensure the aerodynamic shape in the forward position B and the member 40 allows to ensure the aerodynamic sealing in the rearward position A.

Figure 8A:
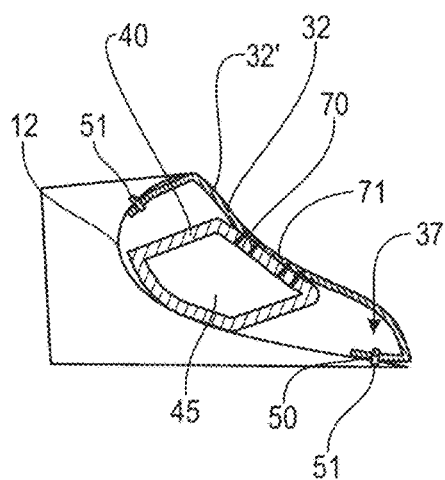
FIGS. 8a, 8b are schematic axial sectional views of alternative embodiments of the sealing system comprising a technical fabric.
Figure 8B:
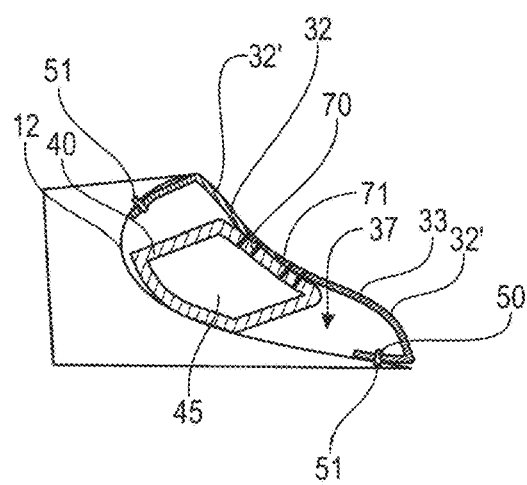
Figure 8C:
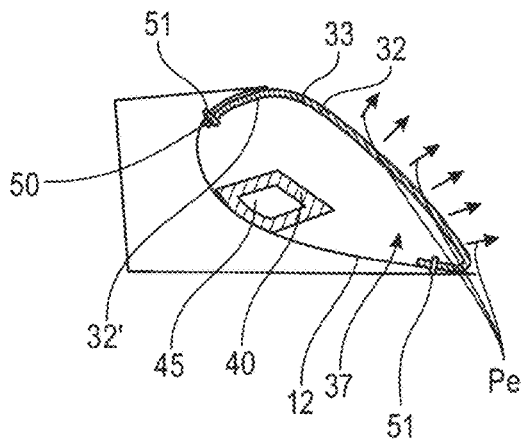
FIGS. 8c, 8d are schematic axial cross-sectional views of alternative embodiments of the sealing system comprising a technical fabric.
Figure 8D:
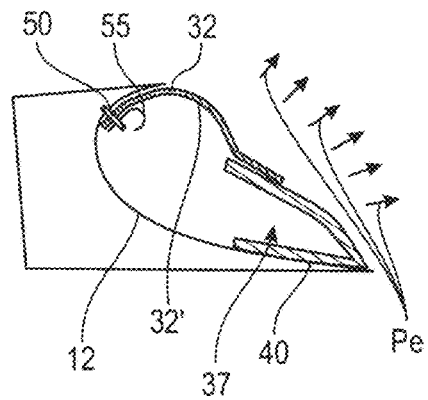

The technical fabric envelope 32 may be attached to the member 40 by an attachment means 70, including integral shear pins 71 (FIGS. 8a, 8b and 8d). The envelope 32 made of technical fabric is here attached to the lip 10 by means of clips 51 but could also be sewn to the downstream edge 12 of the lip 10.

Alternatively, the technical fabric envelope 32 may not be attached to the member 40 (FIG. 8c).

As shown in FIG. 8a, the technical fabric envelope 32 may be in one part. Alternatively, and as shown in FIG. 8b, the technical fabric envelope 32 may be in two parts. A first internal part of the envelope 32 is then attached to a second external part of the envelope 32.

The envelope 32 can extend the member 40 (FIG. 8d), which here takes the form of an L. This arrangement allows a continuity of the envelope 32 and of the member 40. The envelope 32 is then in an external position with respect to the member 40.

The technical fabric envelope 32 can be sandwiched between a rounded sheet-metal 55 and the annular lip 10. The rounded sheet-metal 55 facilitates the passage of the envelope 32 from the retracted state to the extended state.

Figure 9A:
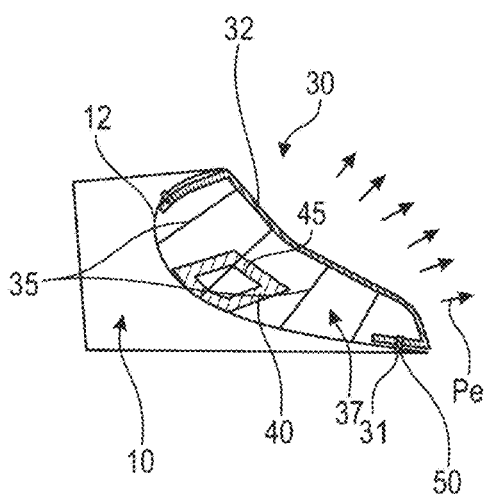
FIGS. 9a and 9b are schematic axial sectional views of alternative embodiments of the sealing system of the disclosure.
Figure 9B:
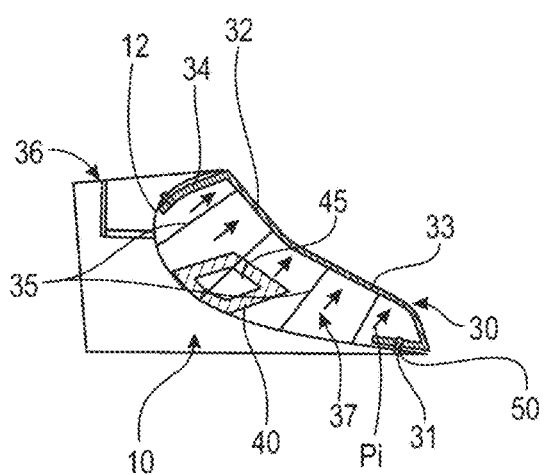

As with an envelope made of elastically deformable material, and as illustrated in FIGS. 9a and 9b, the negative external pressure Pe (e.g. generated by air suction from the engine) will help the technical fabric envelope 32 to expand and stretch naturally like a parachute. If this external pressure causes too much deformation of the technical fabric envelope 32, the latter can be connected by a multitude of wires 35 to the downstream edge 12 of the lip 10. These wires 35 are intended to be tensioned when the envelope 32 is in its extended state. These wires 35 thus allow the technical fabric to be held in the desired extended form.

If the external pressure Pe is not always negative or is insufficient, an internal pressurisation Pi can be used. In this case, and as illustrated in FIG. 9b, the inflatable sealing system 30 can be used. The air can be collected from the external or internal air at the air intake 2 if the pressure is positive and sufficient. Indeed, the space 37 may possibly be connected to the atmosphere outside or inside the air intake by at least one pressurisation pipe 36. This increases the internal pressure Pi and allows the envelope 32 to regain its aerodynamic shape. If the external or internal pressure at the air intake is not sufficient, the air can also be collected from another location of the propulsion unit and conducted through a supply tube into the space 37. The air flow rate can be controlled and the pipe 36 closed when the translation bars (referenced 11 in FIG. 2b) are retracted.

The various embodiments of the member 40 and of the envelope 32 shown can be used either with the envelope 32 made of elastically deformable material or with the envelope 32 made of technical fabric.

Thus, all of the above configurations of the member 40 and/or the envelope 32 can be combined with each other to make a sealing system 30 according to the disclosure. The disclosure thus offers a flexibility of configuration through the multitude of options for the shape, attachment and arrangement of the envelope 32 and/or of the member 40.

The disclosure is applicable to all the aircrafts and engines with a variable geometry air intake.

The invention claimed is:

1. A propulsion unit for an aircraft, the propulsion unit comprising:
    a gas generator having a longitudinal axis and comprising at least one compressor, a combustion chamber, and at least one turbine arranged one behind the other along the longitudinal axis, and
    an air intake of a tubular shape disposed upstream of the gas generator with reference to a flowing of gases during operation, the air intake comprising an upstream annular lip which is movable in axial translation along said longitudinal axis from a rearward position, in which the lip comprises a downstream edge adjoining an upstream edge of the rest of the air intake, and a forward position, in which the downstream edge of the lip is spaced from the upstream edge of the rest of the air intake, and
    an annular sealing system which is carried by the lip at a level of the downstream edge and which is configured to adopt, in said rearward position, a restricted state in which the sealing system ensures a sealing between the downstream edge of the lip and the upstream edge of the rest of the air intake, and an extended state in which the sealing system defines, at the level of said downstream edge, an aerodynamic airflow profile inside the gas generator,
    wherein the sealing system comprises:
    an annular envelope made of a first material and extending around the longitudinal axis and at the level of the downstream edge of the lip, the envelope comprising a downstream annular surface configured to bear on the upstream edge of the rest of the air intake and to define said aerodynamic profile, and
    at least one member made of a second material different from the first material and elastically deformable, the member being located at the level of the downstream edge of the lip and configured to be elastically deformed by compression when the lip is in the rearward position and to exert an elastic return force on the envelope when the lip passes from the rearward position to the forward position, so that the sealing system adopts the aforementioned extended state autonomously, and wherein the at least one member is selected from:

an annular leg made of elastically deformable material, an annular seal made of elastically deformable material and comprising an internal annular cavity, and a spring, the propulsion unit further comprising a plurality of springs distributed around the longitudinal axis on the downstream edge of the lip.

2. The propulsion unit according to claim 1, wherein said first material is an elastically deformable material or a technical fabric.

3. The propulsion unit according to claim 1, wherein the envelope is L-shaped or C-shaped in axial cross-section and comprises at least one cylindrical rim configured to attach or to connect to the downstream edge of the lip.

4. The propulsion unit according to claim 1, wherein the at least one member is housed in an annular space defined between the envelope and the downstream edge of the lip.

5. The propulsion unit according to claim 1, wherein the at least one member is intimately connected to the envelope by attaching means and extends at least partly in an extension thereof and forms a part of the envelope.

6. The propulsion unit according to claim 1, wherein at least one of elements selected from the envelope and the at least one member is attached by at least one clip, one clamp, or seam to the downstream edge of the lip.

7. The propulsion unit according to claim 1, wherein the envelope is connected by a plurality of wires to the downstream edge of the lip, the wires being configured to be tensioned when the envelope is in the extended position.

8. The propulsion unit according to claim 7, wherein an annular space is connected to an atmosphere by at least one pressurization pipe.

9. The propulsion unit according to claim 1, wherein the at least one member has a shape of L, C, Ω, V, S, K or O in axial cross-section.

10. A propulsion unit for an aircraft, the propulsion unit comprising:

a gas generator having a longitudinal axis and comprising at least one compressor, a combustion chamber, and at least one turbine arranged one behind the other along the longitudinal axis, and an air intake of a tubular shape disposed upstream of the gas generator with reference to a flowing of gases during operation, the air intake comprising an upstream annular lip which is movable in axial translation along said longitudinal axis from a rearward position, in which the lip comprises a downstream edge adjoining an upstream edge of the rest of the air intake, and a forward position, in which the downstream edge of the lip is spaced from the upstream edge of the rest of the air intake, and an annular sealing system which is carried by the lip at a level of the downstream edge and which is configured to adopt, in said rearward position, a restricted state in which the sealing system ensures a sealing between the downstream edge of the lip and the upstream edge of the rest of the air intake, and an extended state in which the sealing system defines, at the level of said downstream edge, an aerodynamic airflow profile inside the gas generator, wherein the sealing system comprises:

an annular envelope made of a first material and extending around the longitudinal axis and at the level of the downstream edge of the lip, the envelope comprising a downstream annular surface configured to bear on the upstream edge of the rest of the air intake and to define said aerodynamic profile, and at least one member made of a second material different from the first material and elastically deformable, the member being located at the level of the downstream edge of the lip and configured to be elastically deformed by compression when the lip is in the rearward position and to exert an elastic return force on the envelope when the lip passes from the rearward position to the forward position, so that the sealing system adopts the aforementioned extended state autonomously, wherein the envelope is connected by a plurality of wires to the downstream edge of the lip, the wires being configured to be tensioned when the envelope is in the extended position.

11. The propulsion unit according to claim 10, wherein said first material is an elastically deformable material or a technical fabric.

12. The propulsion unit according to claim 10, wherein the envelope is L-shaped or C-shaped in axial cross-section and comprises at least one cylindrical rim configured to attach or to connect to the downstream edge of the lip.

13. The propulsion unit according to claim 10, wherein the at least one member is housed in an annular space defined between the envelope and the downstream edge of the lip.

14. The propulsion unit according to claim 10, wherein the at least one member is intimately connected to the envelope by an attaching means and extends at least partly in an extension thereof and forms a part of the envelope.

15. The propulsion unit according to claim 10, wherein at least one of elements selected from the envelope and the at least one member is attached by at least one clip, one clamp, or seam to the downstream edge of the lip.

16. The propulsion unit according to claim 10, wherein an annular space is connected to an atmosphere by at least one pressurization pipe.

17. The propulsion unit according to claim 10, wherein the at least one member has a shape of L, C, Ω, V, S, K or O in axial cross-section.

* * * * *